(12) United States Patent
Epaud et al.

(10) Patent No.: US 11,390,196 B2
(45) Date of Patent: Jul. 19, 2022

(54) VEHICLE SEAT WITH INCLINABLE SEAT CUSHION FOR FACILITATING ACCESS TO THE REAR PLACE

(71) Applicant: FAURECIA Sièges d'Automobile, Nanterre (FR)

(72) Inventors: David Epaud, Lardy (FR); Farouk Bouzid, Bretigny sur Orge (FR)

(73) Assignee: FAURECIA Sièges d'Automobile, Nanterre (FR)

( * ) Notice: Subject to any disclaimer, the term of this patent is extended or adjusted under 35 U.S.C. 154(b) by 0 days.

(21) Appl. No.: 16/999,245

(22) Filed: Aug. 21, 2020

(65) Prior Publication Data
US 2022/0009389 A1 Jan. 13, 2022

(30) Foreign Application Priority Data
Aug. 22, 2019 (FR) ...................................... 1909359

(51) Int. Cl.
| | | |
|---|---|---|
| *B60N 2/02* | (2006.01) | |
| *B60N 2/30* | (2006.01) | |
| *B60N 2/12* | (2006.01) | |
| *B60N 2/20* | (2006.01) | |
| *B60N 2/68* | (2006.01) | |

(52) U.S. Cl.
CPC ............. *B60N 2/309* (2013.01); *B60N 2/12* (2013.01); *B60N 2/20* (2013.01); *B60N 2/3011* (2013.01); *B60N 2/3065* (2013.01); *B60N 2/68* (2013.01)

(58) Field of Classification Search
CPC ........ B60N 2/309; B60N 2/12; B60N 2/3065; B60N 2/3011; B60N 2/20; B60N 2/68
See application file for complete search history.

(56) References Cited

U.S. PATENT DOCUMENTS

| | | | | |
|---|---|---|---|---|
| 8,424,969 | B2 * | 4/2013 | Kammerer | B60N 2/0292 |
| | | | | 297/329 |
| 10,442,322 | B2 * | 10/2019 | Handigol | B60N 2/0232 |
| 10,618,444 | B2 * | 4/2020 | Kish | B60N 2/165 |
| 10,661,683 | B2 * | 5/2020 | Becker | B60N 2/3011 |
| 10,926,673 | B2 * | 2/2021 | Kaemmerer | B60N 2/3011 |
| 11,040,641 | B2 * | 6/2021 | Epaud | B60N 2/32 |
| 2002/0125753 | A1 * | 9/2002 | Kammerer | B60N 2/3031 |
| | | | | 297/331 |
| 2004/0061371 | A1 * | 4/2004 | Tame | B60N 2/2352 |
| | | | | 297/378.12 |

(Continued)

FOREIGN PATENT DOCUMENTS

| | | |
|---|---|---|
| DE | 102015217696 | 1/2017 |
| EP | 2845763 | 3/2015 |

(Continued)

*Primary Examiner* — Shin H Kim
(74) *Attorney, Agent, or Firm* — Barnes & Thornburg LLP (57) ABSTRACT

A vehicle seat comprising a seat back with a seat back frame, a seat cushion with a seat cushion frame and one first and second links. The first link is mounted pivoting relative to the seat cushion frame around a first transverse axis, and relative to a seat support around a second transverse axis. The second link is mounted pivoting relative to the seat cushion frame around a third transverse axis, and relative to a seat support around a fourth transverse axis. The first and second links are configured in order to allow lifting a rear part of the seat cushion frame relative to said seat support.

17 Claims, 5 Drawing Sheets

(56) References Cited

U.S. PATENT DOCUMENTS

| | | | |
|---|---|---|---|
| 2006/0033373 A1* | 2/2006 | Kammerer | B60N 2/10 297/378.1 |
| 2017/0253146 A1* | 9/2017 | Cooley | B60N 2/123 |
| 2018/0257516 A1* | 9/2018 | Becker | B60N 2/3065 |
| 2019/0092191 A1* | 3/2019 | Bouzid | B60N 2/309 |
| 2019/0152352 A1* | 5/2019 | Handigol | B60N 2/1695 |
| 2019/0351792 A1* | 11/2019 | Kaemmerer | B60N 2/2356 |
| 2019/0366886 A1* | 12/2019 | Sivaraj | B60N 2/3065 |
| 2019/0389335 A1* | 12/2019 | Epaud | B60N 2/3065 |
| 2021/0197693 A1* | 7/2021 | Runde | B60N 2/067 |

FOREIGN PATENT DOCUMENTS

| | | |
|---|---|---|
| FR | 3068929 | 1/2019 |
| KR | 20130066406 | 6/2013 |
| WO | 2018046433 | 3/2018 |

\* cited by examiner

VEHICLE SEAT WITH INCLINABLE SEAT CUSHION FOR FACILITATING ACCESS TO THE REAR PLACE

PRIORITY CLAIM

This application claims priority to French Patent Application No. FR1909359, filed Aug. 22, 2019, which is expressly incorporated by reference herein.

BACKGROUND

The present disclosure relates to a vehicle seat, a vehicle seat assembly, and a method for implementing such a vehicle seat.

SUMMARY

According to the present disclosure, a vehicle seat is described comprising a seat back with a seat back frame, a seat cushion with a seat cushion frame and at least one first and second links In illustrative embodiments, the first link is mounted pivoting relative to the seat cushion frame around a first transverse axis, in the area of one front end of the seat cushion frame.

In illustrative embodiments, the first link is further intended to be mounted pivoting relative to a seat support around a second transverse axis.

In illustrative embodiments, the second link is mounted pivoting relative to the seat cushion frame around a third transverse axis.

In illustrative embodiments, the second link is further intended to be mounted pivoting relative to said seat support around a fourth transverse axis.

In illustrative embodiments, the at least first and second links are configured in order to allow lifting a rear part of the seat cushion frame relative to the seat support.

BRIEF DESCRIPTIONS OF THE DRAWINGS

The detailed description particularly refers to the accompanying figures in which.

DETAILED DESCRIPTION

In the various figures, the same references designate identical or similar items.

In the description which follows, the indications for spatial positioning such as top, bottom, upper, lower, horizontal, vertical, etc. are given for clarity of the exposition, according to the usual position of use of the seat, but are not limiting. More specifically, the orientations relative to the front and rear of the seat are relative to the usual position of use of the seat.

Longitudinal direction is understood as any direction extending between the front and rear of the vehicle seat. Transverse direction is understood as any direction extending from one side of the vehicle seat towards the other side of the vehicle seat. Preferably, the longitudinal and transverse directions are substantially horizontal. The longitudinal and transverse directions are perpendicular. Vertical direction is understood as any direction perpendicular to the longitudinal and transverse directions.

Figure 1:
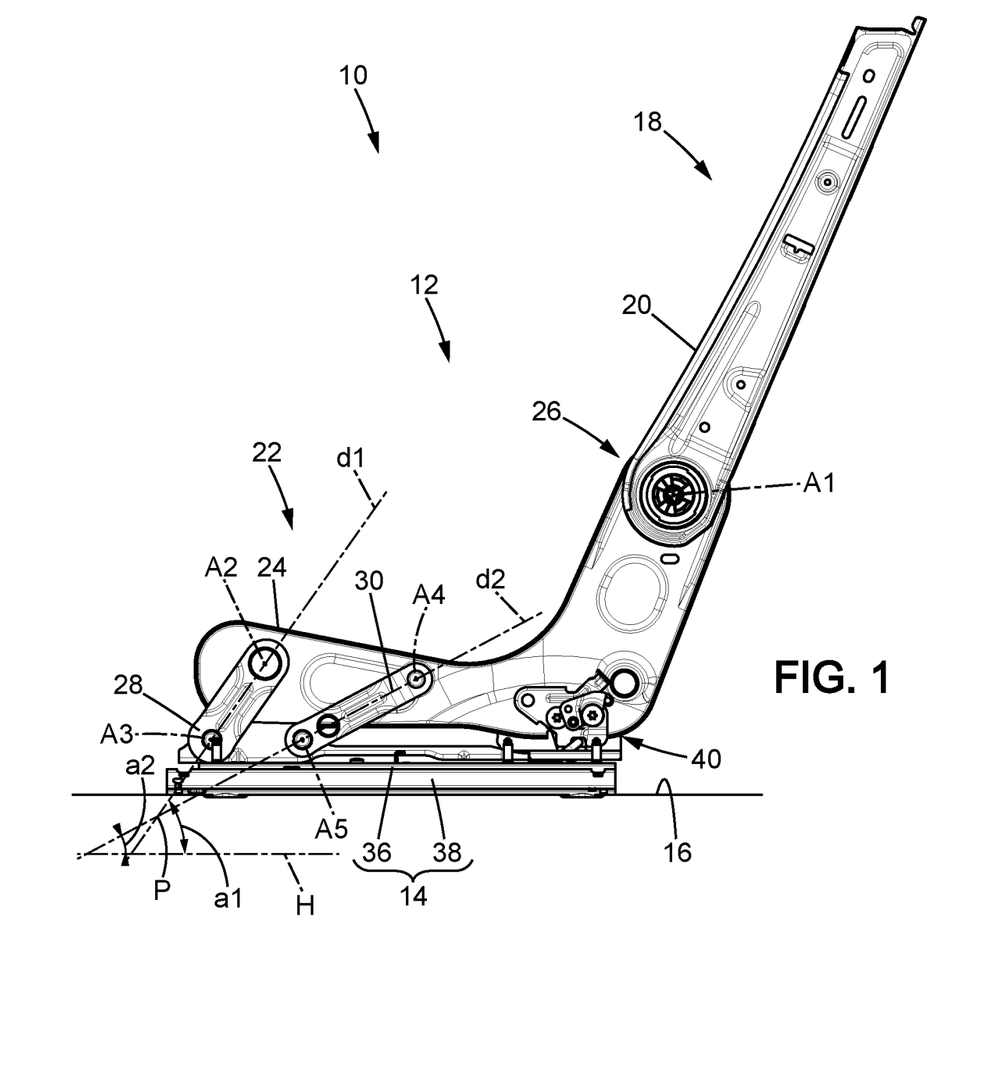
FIG. 1 schematically shows, in longitudinal section, an automotive vehicle seat assembly, where the automotive vehicle seat is in a position described as nominal, suited for receiving an occupant in seated position.

As shown in FIG. 1, a vehicle seat assembly 10 comprises a seat 12 and a seat support 14. The seat 12 is fixed on the seat support 14. Here the seat support 14 is a slider. The slider 14 is itself attached to the floor 16 of the compartment of an automotive vehicle. Alternatively, the support 14 is formed by the floor 16 of the vehicle.

The seat 12 comprises first a seat back 18 with a seat back frame 20. The seat 12 also comprises a seat cushion 22, with a seat cushion frame 24. The seat 12 can for example be a front seat of a three-door automotive vehicle. In another variant, the seat 12 may be a seat from the second row of seats in a five-door vehicle comprising three rows of seats.

Figure 4:
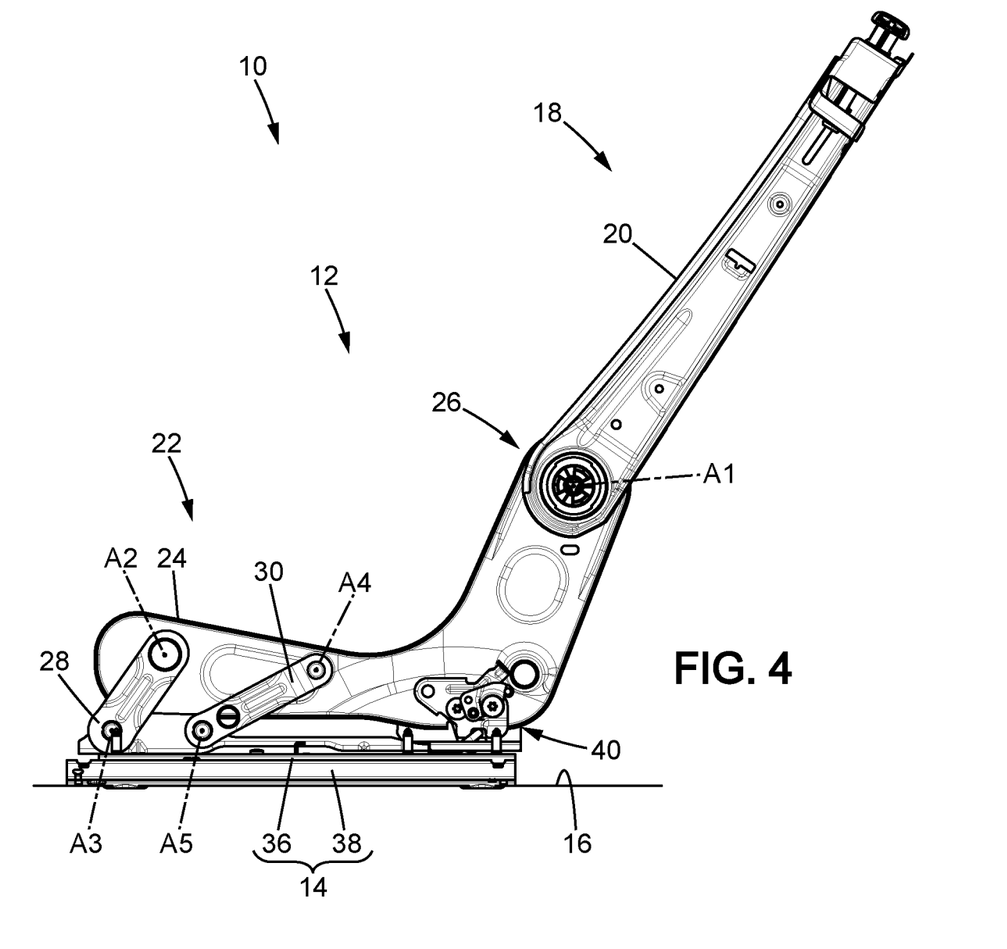
FIG. 4 schematically shows, in longitudinal section, the seat assembly from FIG. 1, where the vehicle seat is in a position described as comfort, suited for receiving an occupant.

The seat back frame 20 and the seat cushion frame 24 are pivoting relative to each other around a fifth transverse axis A1. In the case at hand, the seat back and cushion frame 20, 24 are connected by means of a hinge 26. In the case at hand, the hinge 26 is continuous, at least over a range of rotation angle values of the seat back frame 20 relative to the seat cushion 24. Because of the hinge 26, the angular position of the seat back frame 20 relative to the seat cushion frame 24 can be adjusted according to the preferences of the occupant of the seat 12, as shown in FIG. 4.

The seat 12 is connected to the slider 14 near the seat cushion 22. The slider 14 comprises at least one rail 36 mobile relative to the at least one fixed profile 38, where the number of mobile rails 36 is equal to the number of fixed profiles 38. In the case at hand, the slider 14 comprises two fixed profiles 38 placed near the opposite lateral sides of the seat cushion 22, where each fixed profile 38 is associated with a mobile rail 36. The mobile rails 36 are designed so as to be able to slide along the fixed profiles 38.

Thus, a translational movement of the seat 12 in a longitudinal direction, parallel to the direction of extension of the slider 14, is possible. This way the position of the seat 12 can be adapted, in particular relative to the steering wheel and/or the pedals, according to the preferences and/or physical parameters of the occupant of the seat 12. A device for locking the mobile rail into position relative to the fixed profile serves to keep the seat in a longitudinal position selected by the occupant.

Figure 2:
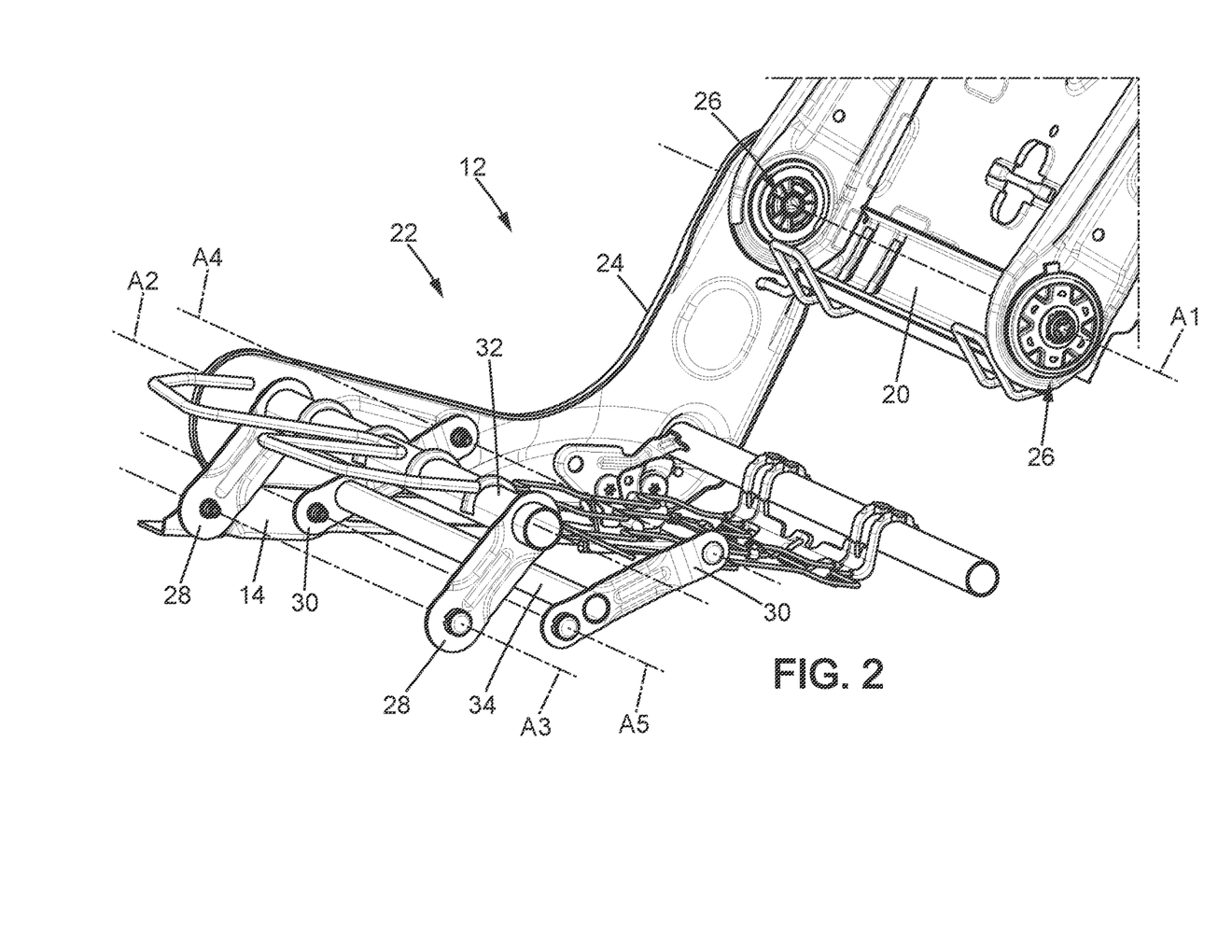
FIG. 2 schematically shows in perspective a detail of the vehicle seat shown in FIG. 1.

As is particularly visible in FIG. 2, here the connection between the seat cushion frame 24 and the slider 14 is made here by means of two first links 28 and two second links 30. The first links 28 are disposed each on one respective side of the seat 12. The second links 30 are disposed each on one respective side of the seat 12. The first and second links 28, 30 are placed in the area of a front end of the seat cushion frame 24. The first links 28 are placed longitudinally in front of the second links 30. Here, the first links 28 are shorter than the second links 30.

Each first link 28 is mounted pivoting relative to the seat cushion frame 24 around a first transverse axis A2. Similarly, each first link 28 is mounted pivoting relative to the slider 14 around a second transverse axis A3.

Each second link 30 is mounted pivoting relative to the seat cushion frame 24 around a third transverse axis A4. Similarly, each second link 30 is mounted pivoting relative to the slider 14, around a fourth transverse axis A5.

In the longitudinal section plane from FIG. 1, where the seat 12 is in the nominal position thereof suited to receiving an occupant in seated position, the transverse axes A2, A3, A4, A5 are points, disposed such that the straight line d1 connecting the first and second transverse axes A2, A3 and the straight line d2 connecting the third and fourth transverse axes A4, A5 intersect in a single point. In the case at hand, the straight lines d1 and d2 intersect in a point P located longitudinally forward of the first, second, third and fourth transverse axes A2, A3, A4, A5, in the longitudinal section plane from FIG. 1. Thus, the straight lines d1 and d2 of extension of the first and second links 28, 30 are not parallel in the nominal position of the seat 12. Here, direction of extension of a link is understood to mean the straight line extending in the plane of the link and connecting the two axes of rotation of the considered link.

Further, in the nominal position of the seat 12, the straight line d1 corresponding to the first link 28, disposed longitudinally the farthest forward in the seat 12, forms, with the horizontal H, an angle a1 larger than the angle a2 formed by the straight line d2 corresponding to the second link 30 disposed longitudinally farther rearward in the seat 12 than the first link 28, with the horizontal H.

As shown in FIG. 2, the first two links 28 are connected to each other by a first crosspiece 32. Here the first crosspiece 32 has a substantially cylindrical shape with an axis corresponding to the first transverse axis A2. The first two links 28 are for example mounted pivoting relative to the first crosspiece 32, which can thus be rigidly fixed to the seat cushion frame 24. Alternatively, the first two links 28 are rigidly fixed to the first crosspiece 32 which is mounted pivoting relative to the seat cushion frame 24. It is also possible to mount the first two links 28 pivoting relative to the first crosspiece 32, where the crosspiece 32 is mounted pivoting relative to the seat cushion frame 24. The first links 28 are thus secured by the first crosspiece 32.

Similarly the second two links 30 are connected to each other by a second crosspiece 34. Here, the second crosspiece 34 has a substantially cylindrical shape extending transversely between the second two links 30. The second two links 30 are for example rigidly fixed to the second crosspiece 34. In that way, the second links are thus secured by the second crosspiece 34.

FIG. 2 further shows that a hinge 26 is provided for each lateral side of the seat 12 between the seat back frame 20 and the seat cushion frame 24.

As can be particularly seen in FIG. 2, preferably, there are no other links connecting the seat cushion frame 24 to the support 14 than the first and second links 28, 30. Also, there is no preference for a link directly connecting the seat back frame 20 to the support 14.

For example, the number of first links 28 and the number of second links 30 are equal to the number of mobile rails 36 of the slider 14. A first link 28 and a second link 30 can thus be associated respectively with one mobile rail 36. In the example shown, two first links 28 and two second links 30 are used, as shown in FIG. 2.

The slider 14 here comprises a pair of mobile rails 36, where each mobile rail 36 is received in a fixed profile 38. Bearings or other rolling elements can be interposed between a mobile rail 36 and the fixed profile 38 in which it slides. This further reduces the rubbing during sliding of the mobile rail 36 in the fixed profile 38. A mobile rail 36 and fixed profile 38 assembly is disposed on each side of the seat 12. A first link 28 and a second link 30 are fixed pivoting on each of the mobile rails 36. The range of the mobile rail 36 in the fixed profile 38 is for example greater than or equal to 150 mm and/or less than or equal to 250 mm. Here, the range of the mobile rail 36 is limited to 150 mm. This limits the dimension of the seat assembly 10.

A locking device, not shown in the figures and well-known in itself to the person skilled in the art, serves to immobilize at least one mobile rail 36 in the associated fixed profile 38, preferably each mobile rail 36 in the associated fixed profile 38.

Finally, a bolt 40 is used here for fixing the rear of the seat cushion frame 24 to the mobile rails 36 of the slider 14. The bolt 40 is disposed near a rear end of the seat cushion frame 22. The bolt 40 in particular prevents an unexpected lifting of the rear part of the seat cushion frame 24 relative to the front part of the seat cushion frame 24, for example in case of impact. When the rear of the seat cushion frame 24 is fixed to the slider 14, the first and second links 28, 30, disposed on each side of the seat 12, are oriented from the bottom and front of the seat 12 towards the top and rear of the seat 12, where the first link 30 is more inclined towards the rear than the second link 28.

Figure 3:
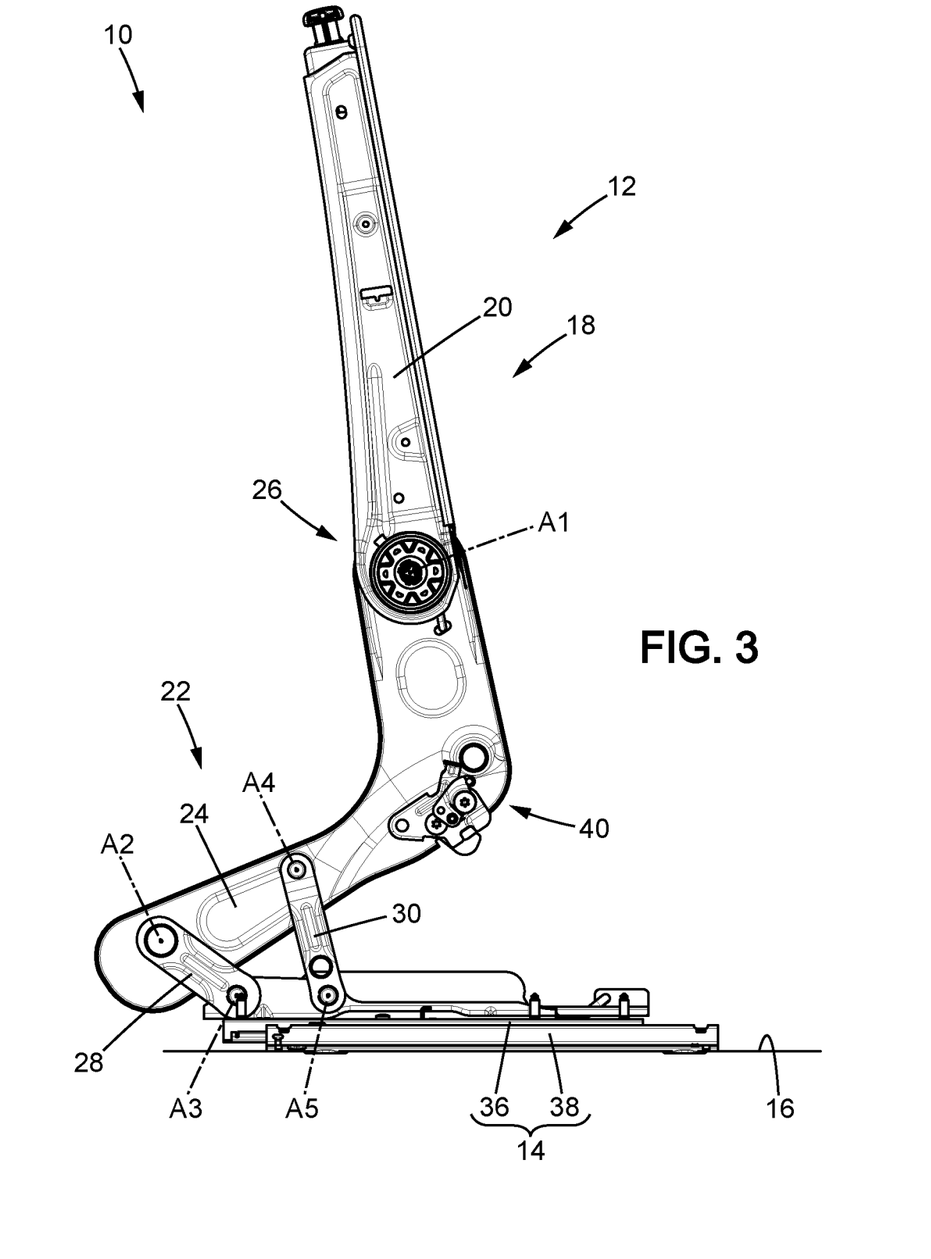
FIG. 3 schematically shows in longitudinal section the seat assembly from FIG. 1, where the automotive vehicle seat is in an easy entry position, allowing access to seats disposed behind the seat shown.

As shown in FIG. 3, the seat 12 can be tilted forward, in an easy entry position facilitating access to the places located behind the seat 12.

This easy entry position is in particular useful in cars with a number of pairs of doors less than the number of rows of seats, in order to facilitate entry and exit of passengers seated in rows of seats which do not have doors.

As can be seen in FIG. 3, the easy access position can be reached without having to pivot the seat back frame 20 about the seat cushion frame 24. Thus, the hinge 26 is not used for moving from a nominal position of the seat to the easy entry position. In particular a baby seat installed on the seat 12 can be left in position this way when accessing the rear positions located behind the seat 12. This way, the comfort adjustment of the incline of the seat back frame 20 relative to the seat cushion frame 24, chosen by the occupant of the seat, can be retained even after passing into easy entry position.

Here, this easy entry position is reached by unlocking the bolt 40 in order to tilt the seat cushion frame 24 forward. Pivoting of the seat cushion frame 24 is guided by the first and second links 28, 30 which pivot around the second and fourth transverse axis A3, A5. With this tilting of the seat cushion frame 24, a rear part of the seat cushion frame 22 can be raised relative to the seat support 14 and, preferably, to a front part of the seat cushion frame 24, so that the space under the seat cushion frame 24, at the rear of the seat 12, can be cleared. In that way the space for the passage of the feet of the passengers wanting to access the places behind the seat 12 is increased, facilitating access to these places.

For further increasing the space for the feet of the occupants wanting to access the places behind the seat 12, the easy entry position can correspond to the case where the seat cushion frame 24 is moved the farthest forward possible by means of the slider 14. In other words, in the easy entry position, the mobile rails 36 are the farthest forward possible compared to the fixed profiles 38.

In order to coordinate the forward movement and the forward tilting of the seat cushion frame 24, in order to move from the nominal position of the seat 12 from FIG. 1 to the easy entry position in FIG. 3, automatic unlocking of the locking device, which locks the mobile rails 36 in the fixed profiles 38, can be provided when the seat cushion frame 24 is tilted forward. For example, the first or second links 28, 30 have a projecting relief which, when the links 28, 30 pivot, command the unlocking of the locking device. This unlocking of the mobile rails 36 relative to the fixed profiles 38 can allow a greater range of the mobile rails 36 compared to the authorized range of the mobile rails 36 in connection with a comfort adjustment. For example, the range of a mobile rail 36 for comfort adjustment can be limited to 150 mm whereas the range of a mobile rail 36 for reaching the entry position can be 250 mm.

However, it should be noted here that the range of the mobile rails 36 in the fixed profiles 38 can be limited, in particular of the order of 150 mm. In fact, the tilting of the seat cushion frame 24 is used to get a passage to the places behind the seat 12, substantially equivalent of the passage obtained by pivoting the seat frame as is done in the prior art.

Figure 5:
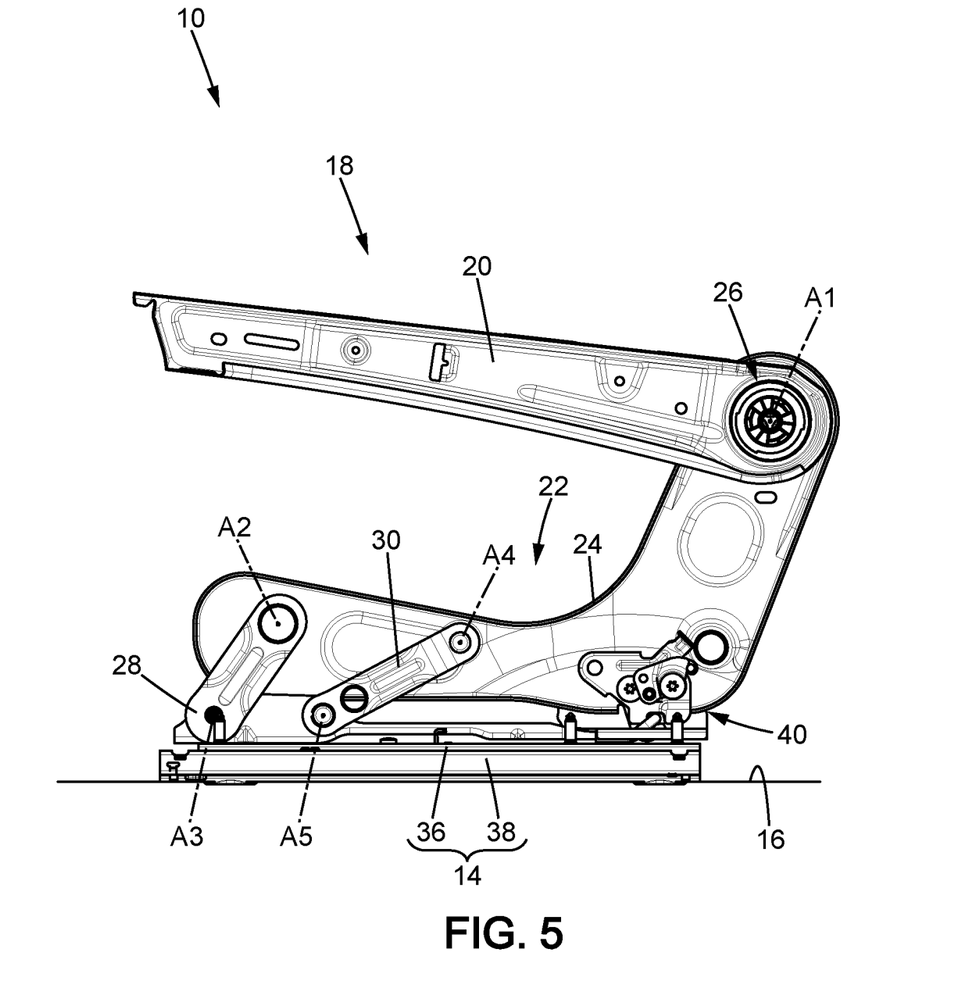
FIG. 5 schematically shows, in longitudinal section, the seat assembly from FIG. 1, where the seat is in a folded down position.

FIG. 5 shows a folded down position of the seat 12. This position can be reached by means of the presence of the hinge 26 or hinges 26. This folded down position can be reached in particular in a disengaged configuration of the hinge 26 or hinges 26, meaning in a position of the seat back frame 20 which is not blocked by the hinge 26 or the hinges 26. For example, the hinge 26 or hinges 26 serve to block the frame of the seat back 20 in position relative to the seat cushion frame 24 over an angular range. Beyond this angular range, the hinge 26 or hinges 26 are disengaged, such that the seat back frame 20 can freely pivot around the transverse axis A1, relative to the seat cushion frame 24.

The folded down position of the seat 12 corresponds to particularly compact configuration of the seat 12 which allows for example increasing the storage volume of the vehicle, in particular when the seat 12 is a rear seat. Alternatively, in this folded down position, the seat back 18 of the seat can be used as a table.

In the folded down position, the seat back 18 is substantially horizontal and parallel to the seat cushion 22.

The folded down position can for example be maintained with a stop, not shown, which keeps the seat back 18 in a substantially horizontal position.

In an embodiment, an easy entry position can be reached by lifting the rear part of the seat cushion frame 24, even when the seat 12 is placed in folded down position.

It can be noted that all the transverse axes A1-A5 are distinct in the example shown.

The present disclosure is not limited to the example described above with reference to the figures. The present disclosure encompasses in contrast all the variants and combinations which could be considered by the person skilled in the art in connection with the protection sought.

For example, the seat might not have any continuous hinge 26. In the place, the seat back frame can be mounted pivoting relative to the support 14 around the fifth transverse axis, freely or elastically constrained. The seat 12 can then comprise an un-lockable device for holding an angular position of the seat back frame 26 relative to the seat cushion frame 24. The device for holding the seat back frame 26 in angular position relative to the seat cushion frame 24 can allow selectively locking or unlocking the rotation of the seat back frame 20 relative to the seat cushion frame 24. It should be noted that the angular position holding device of the seat back frame 26 relative to the seat cushion frame 24 can be adapted to keeping the seat back frame 20 in any angular position relative to the seat cushion frame 24 in a finite number of angular positions, or even in a singular angular position of the seat back frame 20 relative to the seat cushion frame 24. In this last case, the seat 12 and the seat back 18 have a single comfort position suited to receiving an occupant in seated position.

In particular, a vehicle seat configured for being able to present a position facilitating access to the places located behind the seat (hereinafter the position is described as "easy entry"). Such a seat may be implemented in a vehicle comprising a number of pairs of doors less than the number of rows of seats, in order to allow access to the last row of seats in the vehicle, meaning the row of seats arranged longitudinally the farthest back in the vehicle.

In one example, a comparative easy entry position corresponds to a configuration of the seat where a seat back is inclined towards a seat cushion of the seat. The seat may be mounted on sliders. In this comparative case, the easy entry position may also correspond to the farthest forward possible position of the seat along the slider. Such a comparative configuration however has the disadvantage of limiting the space for passage of the feet of a person wanting to access the rear seats. Access to the rear seats thus remains relatively difficult. The present disclosure aims to improve the situation.

In accordance with the present disclosure, a vehicle seat is described comprising a seat back with a seat back frame, a seat cushion with a seat cushion frame and at least one first and second links, where:

the first link is mounted pivoting relative to the seat cushion frame around a first transverse axis, in the area of one front end of the seat cushion frame;

the first link is further intended to be mounted pivoting relative to a seat support around a second transverse axis;

the second link is mounted pivoting relative to the seat cushion frame around a third transverse axis;

the second link is further intended to be mounted pivoting relative to the seat support around a fourth transverse axis;

the at least first and second links are configured in order to allow lifting a rear part of the seat cushion frame relative to the seat support.

Thus, by lifting the rear of the seat cushion frame of the seat, a space is cleared for the feet of a person wanting to access other seats arranged behind the seat. This facilitates access to these other seats.

In another example, the vehicle seat comprises one or more of the following characteristics, taken alone or in combination:

the vehicle seat comprises a bolt for locking the seat cushion frame in position relative to the seat support;

the seat back frame is mounted pivoting relative to the seat cushion frame around a fifth transverse axis;

the seat back frame is mounted pivoting relative to the seat cushion frame around the fifth transverse axis, at least between a first position in which the seat back frame is substantially parallel to the seat cushion frame and at least one second position for receiving an occupant of the seat;

the vehicle seat comprises a hinge for adjusting the angular position of the seat back frame relative to the seat cushion frame around the fifth transverse axis;

the vehicle seat comprises an un-lockable device for holding an angular position of the seat back frame relative to the seat cushion frame around the fifth transverse axis;

in a nominal position of the seat suited for receiving an occupant of the seat in seated position, in a longitudinal plane of the seat, a first straight line connects the first and second transverse axes, a second straight line connects the third and fourth transverse axes, and the first and second straight lines intersect at a single point, preferably in a point located longitudinally forward of the first, second, third and fourth transverse axes;

the first straight-line forms a first angle with the horizontal, the second straight-line forms a second angle with the horizontal, and the first angle is greater than the second angle; and the first link is shorter than the second link.

According to another aspect, a vehicle seat assembly is described comprising a vehicle seat such as described above in all combinations thereof and the seat support.

According to another illustrative embodiment, the seat assembly comprises one or more of the following characteristics, taken alone or in combination:

the support comprises at least one slider, in particular a mobile rail of a slider;

the at least one slider has a range greater than or equal to 150 mm and/or less than or equal to 250 mm, preferably substantially equal to 150 mm;

the at least one slider comprises a mobile rail, which is mobile relative to a fixed profile, where the seat assembly further comprises a device for locking the mobile rail in position relative to the fixed profile; and the locking device is configured for being unlocked in case of raising a rear part of the seat cushion frame relative to the slider.

According to another example, a method is described for passage from one position of the seat of a seat assembly such as described above in all combinations thereof, and suited for receiving an occupant, into an easy entry position, where the method comprises the steps:

unlocking the bolt configured for locking the seat cushion frame in position relative to the support, as necessary;

raising a rear part of the seat cushion frame of the seat relative to the support; and advancing the mobile rail of the at least one slider in the fixed profile of the at least one slider, as necessary.

According to another example, a method is described for passage from one position of the seat of a seat assembly such as described above in all combinations thereof, and suited for receiving an occupant, into an easy entry position, where the method comprises the steps consisting of:

unlocking the bolt configured for locking the seat cushion frame in position relative to the support, as necessary;

raising a rear part of the seat cushion frame of the seat relative to the support; and advancing the mobile rail of the at least one slider in the fixed profile of the at least one slider, as necessary.

A vehicle is also described, in particular an automotive vehicle comprising a chassis and a body defining a passenger compartment with a floor, and at least one seat assembly such as described above in all combinations thereof, where the seat support is fixed to the floor or formed by the floor of the compartment.

The vehicle can in particular comprise at least one door arranged longitudinally near the seat of the seat assembly, and at least one other seat disposed longitudinally behind the seat of the seat assembly. The vehicle may not have a door arranged longitudinally near the other seat.

The invention claimed is:

1. A vehicle seat comprising
a seat back with a seat back frame,
a seat cushion with a seat cushion frame and at least one first and second links, wherein:
the first link is mounted pivoting relative to the seat cushion frame around a first transverse axis, in the area of one front end of the seat cushion frame;
the first link is further intended to be mounted pivoting relative to a seat support around a second transverse axis;
the second link is mounted pivoting relative to the seat cushion frame around a third transverse axis;
the second link is further intended to be mounted pivoting relative to the seat support around a fourth transverse axis; and
the at least first and second links are configured in order to allow lifting a rear part of the seat cushion frame relative to the seat support,
wherein, in a nominal position of the vehicle seat suited for receiving an occupant of the vehicle seat in seated position, in a longitudinal plane of the vehicle seat, a first straight line connects the first and second transverse axes, a second straight line connects the third and fourth transverse axes, and the first and second straight lines intersect at a point located longitudinally forward of the first, second, third and fourth transverse axes.

2. The vehicle seat of claim 1, comprising a bolt for locking the seat cushion frame in position relative to the seat support.

3. The vehicle seat of claim 1, wherein the seat back frame is mounted pivoting relative to the seat cushion frame around a fifth transverse axis.

4. The vehicle seat of claim 3, wherein the seat back frame is mounted pivoting relative to the seat cushion frame around the fifth transverse axis, at least between a first position in which the seat back frame is substantially parallel to the seat cushion frame and at least one second position for receiving an occupant of the vehicle seat.

5. The vehicle seat of claim 3, comprising a hinge for adjusting the angular position of the seat back frame relative to the seat cushion frame around the fifth transverse axis.

6. The vehicle seat of claim 3, comprising an un-lockable device for holding an angular position of the seat back frame relative to the seat cushion frame around the fifth transverse axis.

7. The vehicle seat of claim 1, wherein the first straight line forms a first angle with the horizontal, the second straight line forms a second angle with the horizontal, and the first angle is greater than the second angle.

8. The vehicle seat of claim 1 wherein the first link is shorter than the second link.

9. A vehicle seat assembly comprising
a seat support and
a vehicle seat comprising a seat back with a seat back frame, a seat cushion with a seat cushion frame and at least one first and second links,
wherein:
the first link is mounted pivoting relative to the seat cushion frame around a first transverse axis, in the area of one front end of the seat cushion frame;
the first link is further mounted pivoting relative to the seat support around a second transverse axis;
the second link is mounted pivoting relative to the seat cushion frame around a third transverse axis;
the second link is further mounted pivoting relative to the seat support around a fourth transverse axis; and
the at least first and second links are configured in order to allow lifting a rear part of the seat cushion frame relative to the seat support, and wherein in a nominal position of the vehicle seat suited for receiving an occupant of the vehicle seat in seated position, in a longitudinal plane of the vehicle seat, a first straight line connects the first and second transverse axes, a second straight line connects the third and fourth transverse axes, and the first and second straight lines intersect at a point located longitudinally forward of the first, second, third and fourth transverse axes.

10. The vehicle seat assembly of claim 9, wherein the support comprises at least one mobile rail of at least one slider.

11. The vehicle seat assembly of claim 10, wherein the at least one slider has a range greater than or equal to about 150 mm.

12. The vehicle seat assembly of claim 10, wherein the at least one slider has a range less than or equal to about 250 mm.

13. The vehicle seat assembly of claim 10, wherein each of the at least one mobile rail is mobile relative to a corresponding fixed profile of one of the at least one slider, and wherein the seat assembly further comprises a device for locking at least one of the mobile rail in position relative to the corresponding fixed profile.

14. The vehicle seat assembly of claim 13, wherein the locking device is configured for being unlocked in case of raising a rear part of the seat cushion frame relative to the slider.

15. A method for passage of a vehicle seat from a vehicle seat assembly from a position suited for receiving an occupant, to an easy entry position, wherein the method comprises the steps of:
providing a vehicle seat assembly comprising a seat support and the vehicle seat, the vehicle seat comprising a seat back with a seat back frame, a seat cushion with a seat cushion frame and at least one first and second links, wherein:
the first link is mounted pivoting relative to the seat cushion frame around a first transverse axis, in the area of one front end of the seat cushion frame;
the first link is further mounted pivoting relative to the seat support around a second transverse axis;
the second link is mounted pivoting relative to the seat cushion frame around a third transverse axis;
the second link is further mounted pivoting relative to the seat support around a fourth transverse axis;
the at least first and second links are configured in order to allow lifting a rear part of the seat cushion frame relative to the seat support, wherein in a nominal position of the vehicle seat suited for receiving an occupant of the vehicle seat in seated position, in a longitudinal plane of the vehicle seat, a first straight line connects the first and second transverse axes, a second straight line connects the third and fourth transverse axes, and the first and second straight lines intersect at a point located longitudinally forward of the first, second, third and fourth transverse axes; and
raising a rear part of the seat cushion frame of the vehicle seat relative to the support.

16. The method of claim 15, wherein the vehicle seat comprises a bolt for locking the seat cushion frame in position relative to the seat support,
the method further comprising a step of unlocking the bolt.

17. The method of claim 15, wherein the seat support comprises at least one mobile rail of at least one slider, wherein each of the at least one mobile rail is mobile relative to a corresponding fixed profile of one of the at least one slider,
the method further comprising a step of advancing the at least one mobile rail of the at least one slider in the corresponding fixed profile.

* * * * *